US012678005B2

(12) United States Patent
Peng

(10) Patent No.: US 12,678,005 B2
(45) Date of Patent: Jul. 14, 2026

(54) CLEANING ROBOT CONTROL METHOD AND DEVICE, STORAGE MEDIUM AND CLEANING ROBOT

(71) Applicant: Beijing Roborock Technology Co., Ltd., Beijing (CN)

(72) Inventor: Song Peng, Beijing (CN)

(73) Assignee: Beijing Roborock Technology Technology Co., Beijing (CN)

( * ) Notice: Subject to any disclaimer, the term of this patent is extended or adjusted under 35 U.S.C. 154(b) by 536 days.

(21) Appl. No.: 17/907,198

(22) PCT Filed: Jan. 8, 2021

(86) PCT No.: PCT/CN2021/070789
§ 371 (c)(1),
(2) Date: Sep. 23, 2022

(87) PCT Pub. No.: WO2021/190083
PCT Pub. Date: Sep. 30, 2021

(65) Prior Publication Data
US 2023/0123326 A1 Apr. 20, 2023

(30) Foreign Application Priority Data
Mar. 26, 2020 (CN) .......................... 202010225559.X

(51) Int. Cl.
*A47L 11/40* (2006.01)
*H04W 24/08* (2009.01)

(52) U.S. Cl.
CPC ....... *A47L 11/4011* (2013.01); *A47L 11/4091* (2013.01); *H04W 24/08* (2013.01);
(Continued)

(58) Field of Classification Search
CPC .............. A47L 11/4011; A47L 11/4091; A47L 2201/022; A47L 2201/04; A47L 2201/06;
(Continued)

(56) References Cited

U.S. PATENT DOCUMENTS

2002/0153185 A1* 10/2002 Song .................... A47L 9/2884
2013/0030750 A1* 1/2013 Kim ....................... G06N 3/004
(Continued)

FOREIGN PATENT DOCUMENTS

CN 106054895 A 10/2016
CN 107831785 A 3/2018
(Continued)

OTHER PUBLICATIONS

EP21775754.1—Extended European Search Report.
(Continued)

*Primary Examiner* — Ellis B. Ramirez
(74) *Attorney, Agent, or Firm* — Thomas Horstemeyer. LLP

(57) ABSTRACT

A cleaning robot control method, applicable to a cleaning robot, includes: obtaining a network status of the cleaning robot and performing a preset action when the network status is a network-disconnected state or a network signal intensity is lower than a preset signal intensity threshold. A computer-readable storage medium and a cleaning robot are further provided.

7 Claims, 2 Drawing Sheets

(52) U.S. Cl.
CPC ..... *A47L 2201/022* (2013.01); *A47L 2201/04* (2013.01); *A47L 2201/06* (2013.01)

(58) Field of Classification Search
CPC ...... A47L 2201/00; A47L 11/24; A47L 11/40; A47L 11/4002; H04W 24/08
USPC ........................... 700/245; 134/56 R; 15/319
See application file for complete search history.

(56) References Cited

U.S. PATENT DOCUMENTS

| | | | | |
|---|---|---|---|---|
| 2013/0060379 A1* | 3/2013 | Choe | ..................... | A47L 9/0488 |
| 2016/0135655 A1* | 5/2016 | Ahn | ..................... | G05D 1/0038 |
| 2016/0198290 A1* | 7/2016 | Hong | ................... | H04B 17/318 |
| 2016/0278599 A1* | 9/2016 | Seo | ........................... | H04Q 9/00 |
| 2017/0013562 A1* | 1/2017 | Lim | ..................... | H04M 1/725 |
| 2017/0309146 A1* | 10/2017 | Mackenzie | ........ | G08B 13/2491 |
| 2018/0146833 A1* | 5/2018 | Halloran | ............... | A47L 9/0477 |
| 2020/0138259 A1* | 5/2020 | Xu | ......................... | A47L 9/2847 |
| 2021/0314218 A1* | 10/2021 | Kang | ..................... | H04B 7/088 |

FOREIGN PATENT DOCUMENTS

| | | | | | |
|---|---|---|---|---|---|
| CN | 108717296 A | 10/2018 | | | |
| CN | 109330495 A | 2/2019 | | | |
| CN | 104977929 B | 4/2019 | | | |
| CN | 109739264 A | 5/2019 | | | |
| CN | 110244769 A | 9/2019 | | | |
| CN | 110308739 A | 10/2019 | | | |
| CN | 110719199 A | 1/2020 | | | |
| CN | 111449572 A | 7/2020 | | | |
| CN | 111654339 A | 9/2020 | | | |
| EP | 1963941 A2 | 9/2008 | | | |
| EP | 1963941 B1 | 2/2012 | | | |
| EP | 3035558 A1 | 6/2016 | | | |
| EP | 3196726 A2 | 7/2019 | | | |
| JP | 2007032953 A | 2/2007 | | | |
| KR | 20070096272 A | 10/2007 | | | |
| KR | 20170087385 A | * | 7/2017 | .......... | G05D 1/0044 |
| KR | 20190003120 A | 1/2019 | | | |

OTHER PUBLICATIONS

International Search Report for PCT Patent Application No. PCT/CN2021/070789 mailed Apr. 16, 2021.
First Office Action for CN Patent Application No. 202010225559.X mailed Apr. 16, 2021.

* cited by examiner

CLEANING ROBOT CONTROL METHOD AND DEVICE, STORAGE MEDIUM AND CLEANING ROBOT

CROSS-REFERENCE TO RELATED APPLICATION

This application is a national phase filing under 35 U.S.C. § 371 of PCT application number PCT/CN2021/070789, which claims priority to Chinese Patent Application No. 202010225559.X, filed on Mar. 26, 2020, both of which are incorporated herein by reference in their entireties.

TECHNICAL FIELD

The present disclosure relates to the field of cleaning robot control technologies, and in particular, to a cleaning robot control method and device, a storage medium, and a cleaning robot.

BACKGROUND

With the development of robotics, robots can already replace human to do some indoor works. For example, automatic cleaning apparatuses (for example, sweeping robots) are gradually increasingly known and used.

SUMMARY

The present disclosure provides a cleaning robot control method and device, a storage medium, and a cleaning robot.

According to an aspect of the present disclosure, a cleaning robot control method is provided. The cleaning robot control method is applicable to a cleaning robot, and the method includes:

obtaining a network status of the cleaning robot; and performing, when the network status is a network-disconnected state or a network signal intensity is lower than a preset signal intensity threshold, a preset action.

Optionally, before obtaining the network status of the cleaning robot, the method further includes:

obtaining a current operation mode of the cleaning robot; and obtaining. when the cleaning robot is currently in an operation mode of network-connected control, the network status of the cleaning robot.

Optionally, the operation mode of network-connected control includes a remote working mode or a "Go to" working mode.

Optionally, when the network status is the network-disconnected state, performing the preset action includes:

timing duration of the network-disconnected state; and performing, when the duration of the network-disconnected state is greater than a preset time threshold, the preset action.

Optionally, when the network signal intensity is lower than the preset signal threshold, performing the preset action specifically includes:

timing when the network signal intensity is lower than the preset signal intensity threshold; and performing, when duration in which the network signal intensity is lower than the preset signal intensity threshold and greater than a preset time threshold, the preset action.

Optionally, performing the preset action includes:

switching the cleaning robot to an automatic cleaning mode and performing a corresponding cleaning action;

maintaining a current operation mode and keeping performing a cleaning action; or returning to a charging dock for charging.

According to another aspect of the present disclosure, a cleaning robot control device is provided. The device includes:

a first obtaining module, configured to obtain a network status of a cleaning robot; and a performing module, configured to perform a preset action when the network status is a network-disconnected state or a network signal intensity is lower than a preset signal threshold.

In addition, the present disclosure further provides a computer-readable storage medium. The computer-readable storage medium stores a computer program, and when the program is executed by a processor, operations of the foregoing method are implemented.

In addition, the present disclosure further provides a cleaning robot. The cleaning robot includes a memory, a processor, and a computer program that is stored in the memory and that is executable by the processor, where when the program is executed by the processor, operations of the foregoing method are implemented.

The foregoing descriptions are merely a summary of technical solutions of the present disclosure. For a clearer understanding of the technology in the present disclosure and therefore implementation according to content in this specification, and the following specifically describes the specific embodiments of the present disclosure, to more explicitly explain the foregoing and other objects, features, and advantages of the present disclosure.

BRIEF DESCRIPTION OF DRAWINGS

With detailed descriptions of following preferred embodiments of this specification, various other advantages and benefits are clearer to one of ordinary skill in the art. The accompanying drawings merely illustrate objectives of the preferred embodiments, but cannot be considered limitations of the present disclosure. In addition, in all the accompanying drawings, a same reference symbol indicates a same component or part. In the accompanying drawings.

DESCRIPTION OF EMBODIMENTS

The following describes example embodiments of the present disclosure with more details with reference to the accompanying drawings. Although the example embodiments of the present disclosure are illustrated in the accompanying drawings, it should be understood that, the present disclosure may be implemented in various manners and should not be limited to the embodiments described herein. On the contrary, the embodiments are provided for the present disclosure to be understood more thoroughly, and for the scope of the present disclosure to be fully understood by one of ordinary skill in the art.

It could be understood by one of ordinary skill in the art that, unless otherwise defined, all terms used herein (including technical terms and scientific terms) have a same meaning as that generally understood by one of ordinary skill in the art to which the present disclosure pertains. It should be further understood that, terms such as those defined in a general dictionary should be understood as having a same meaning as that in context of the prior art, and unless specifically defined, the terms do not bear meanings that are idealistic or too formal.

A cleaning robot to which technical solutions of the present disclosure is applicable may be (but is not limited to) an automatic cleaning apparatus, for example, a sweeping robot, a mopping robot, or an integrated sweeping-mopping robot, and the robot may include a machine body, a sensing system, a control system, a drive system, a cleaning system, a power system, and a human-machine interaction system.

Figure 1:
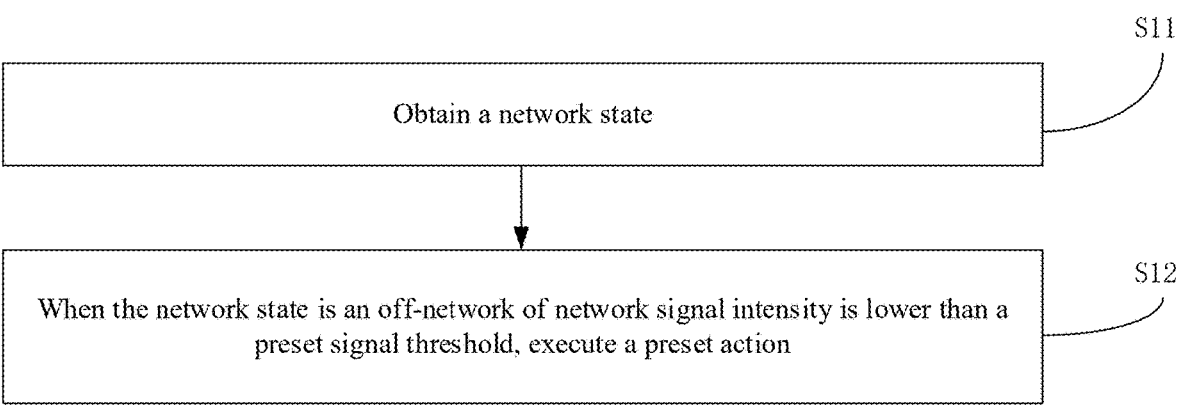
FIG. 1 is a flowchart of a cleaning robot control method according to an embodiment of the present disclosure.

Exemplarily, FIG. 1 is a flowchart of a cleaning robot control method according to an embodiment of the present disclosure. Referring to FIG. 1, the cleaning robot control method according to this embodiment of the present disclosure is applied to a cleaning robot end, and specifically includes following steps:

Step S11: a network status of the cleaning robot is obtained.

In operation, the cleaning robot is connected to a user terminal through typical wireless communications such as a 3G network, a 4G network, a 5G network, and a Narrow Band Internet of Things (NB-IoT), so as to be controlled through the internet. In this embodiment, a current network connection may be specifically monitored by the cleaning robot in a universal network monitoring manner, to obtain the network status of the cleaning robot.

In this embodiment, the cleaning robot can obtain a current network connection status in real time, or obtain, according to a preset monitoring periodicity, a network connection status corresponding to a monitoring time point periodically.

Step S12: A preset action is performed when the network status is a network-disconnected state or a network signal intensity is lower than a preset signal intensity threshold.

The preset signal intensity threshold is a minimum signal value to ensure that a network control function can be normally performed on the cleaning robot, and may be configured in advance or be configured by a user based on an actual application scenario.

The network status of the cleaning robot affects control on cleaning of the cleaning robot, and a network status in an actual working environment is unstable. Consequently, a network signal intensity is often low or even network disconnection occurs. Therefore, in this embodiment, after accessing a network, when working under control of the user terminal, the cleaning robot monitors the current network status in real time. If it is detected that the cleaning robot is disconnected from the network, or the network signal intensity is lower than the preset signal intensity threshold, the cleaning robot performs the preset action, to avoid affecting use of a user due to a failure of robot positioning or an abrupt shutdown, thereby improving user experience.

Figure 2:
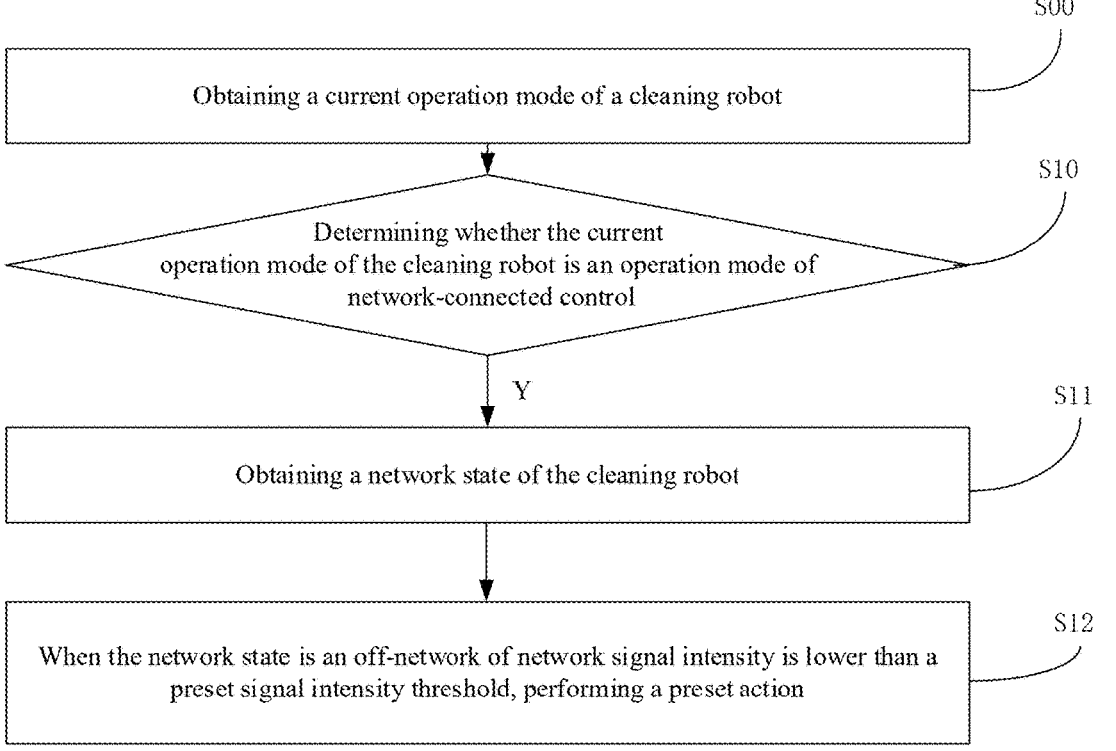
FIG. 2 is a flowchart of a cleaning robot control method according to another embodiment of the present disclosure.

Exemplarily, FIG. 2 is a flowchart of a cleaning robot control method according to another embodiment of the present disclosure. Referring to FIG. 2. The cleaning robot control method according to this embodiment of the present disclosure specifically includes following steps:

Step S00: A current operation mode of the cleaning robot is obtained.

Step S10: It is determined whether the current operation mode of the cleaning robot is an operation mode of network-connected control, and when the cleaning robot is currently in the operation mode of network-connected control, step S11 is performed.

Step S11: A network status of the cleaning robot is obtained. In this embodiment, the cleaning robot may obtain a current network connection status in real time, or may periodically obtain, according to a preset monitoring periodicity, a network connection status at each monitoring time point.

Step S12: a preset action is performed when the network status is a network-disconnected state or a network signal intensity is lower than a preset signal intensity threshold.

In this embodiment of the present disclosure, the operation mode of the cleaning robot includes the operation mode of network-connected control that requires real-time network connection control and another operation mode such as an automatic cleaning mode that does not require real-time network connection control. When the cleaning robot is operated in the operation mode of network-connected control, a real-time network status is significant for controlling cleaning of the cleaning robot. Therefore, in this embodiment, before obtaining the network status of the cleaning robot, the cleaning robot is required to obtain the current operation mode of the cleaning robot in advance. If the cleaning robot currently is operated in the operation mode of network-connected control, corresponding control is performed based on the obtained network status, to avoid affect normal operation of the operation mode of network-connected control due do the network, which causes a user unable to position the cleaning robot through a user terminal or the cleaning robot to shut off abruptly, thereby affecting user experience.

In this embodiment, the operation mode of network-connected control that requires real-time network connection control includes but is not limited to a remote working mode or a "Go to" working mode. The "Go to" indicates a working mode in which the cleaning robot automatically moves to a position after the user designates the position.

It should be noted that, the remote working mode or the "Go to" working mode is merely taken as an example for describing a specific operation mode of the working mode of network-connected control, and cannot be construed as a limit on the operation mode of network-connected control.

In this embodiment of the present disclosure, when the cleaning robot is currently not in the operation mode of network-connected control, because that a real-time network status has a relatively small influence on implementation of control of the cleaning robot, the network status of the cleaning robot is not required to be monitored, and the cleaning robot can be operated according to a usual procedure.

In an embodiment of the present disclosure, when the network status is the network-disconnected state, duration of the network-disconnected state is timed. Specifically, when the duration of the network-disconnected state is greater than a preset first time threshold, the cleaning robot performs the preset action.

In another embodiment of the present disclosure, when the network signal intensity is lower than the preset signal intensity threshold, duration of the signal intensity continually being lower than the preset signal intensity threshold is timed. Specifically, when the duration of the signal intensity continually being lower than the preset signal intensity threshold is greater than a preset second time threshold, the cleaning robot performs the preset action.

Specific values of the first time threshold and the second time threshold may be set in advance, or be set by a user. In an embodiment of the present disclosure, the first time threshold is equal to a second time threshold.

In this embodiment of the present disclosure, that the preset action is performed specifically includes but is not limited to following specific implementations:

switching the cleaning robot to an automatic cleaning mode and performing a corresponding cleaning action, maintaining a current operation mode and keeping performing a cleaning action, or returning to a charging dock for charging.

In the cleaning robot control method according to the embodiments of the present disclosure, when the cleaning robot is disconnected from a mobile terminal because the cleaning robot is in the network-disconnected state or the network signal intensity is lower than the preset signal intensity threshold, the cleaning robot is switched to the automatic cleaning mode and performs the corresponding cleaning action, maintains the current operation mode and keeps performing the cleaning action, or returns to the charging dock for charging, to avoid affecting use due to a failure of positioning the cleaning robot or an abrupt shutdown, thereby improving user experience.

For brief description, the method embodiments are described as a combination of a series of actions, but one of ordinary skill in the art should know well that the embodiments of the present disclosure are not limited by a sequence of the described actions. Therefore, according to the embodiments of the present disclosure, some steps may be performed in another sequence or simultaneously. In addition, one of ordinary skill in the art should further know well that all the embodiments described in this specification are exemplary embodiments, and not all described actions are necessary for the embodiments of the present disclosure.

Figure 3:
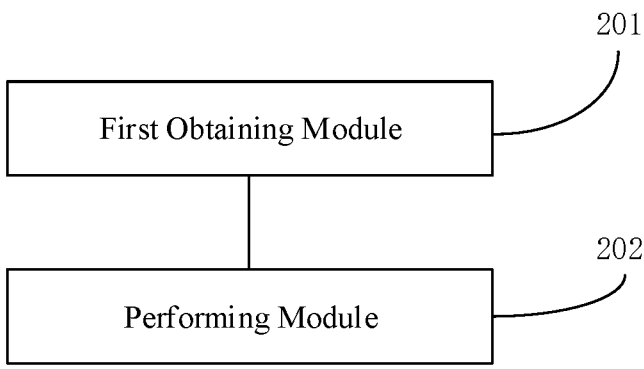
FIG. 3 is a structural block diagram of a cleaning robot control device according to an embodiment of the present disclosure.

Exemplarily, FIG. 3 is a schematic structural diagram of a cleaning robot control device according to an embodiment of the present disclosure. Referring to FIG. 3, the cleaning robot control device according to this embodiment of the present disclosure specifically includes a first obtaining module 201 and a performing module 202.

The first obtaining module 201 is configured to obtain a network status of a cleaning robot.

The performing module 202 is configured to perform a preset action when the network status is a network-disconnected state or a network signal intensity is lower than a preset signal intensity threshold.

Figure 4:
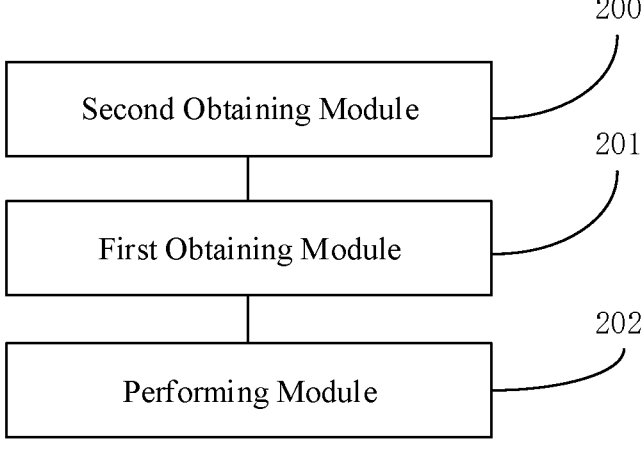
FIG. 4 is a structural block diagram of a cleaning robot control device according to another embodiment of the present disclosure.

In this embodiment of the present disclosure, as illustrated in FIG. 4, the device further includes a second obtaining module 200. The second obtaining module is configured to: obtain, before the first obtaining module 201 obtains the network status of the cleaning robot, a current operation mode of the cleaning robot.

The first obtaining module 201 is specifically configured to: perform, when the cleaning robot is currently in an operation mode of network-connected control, the operation of obtaining the network status of the cleaning robot.

The operation mode of network-connected control that requires real-time network connection control includes but is not limited to a remote working mode or a "Go to" working mode.

It should be noted that, the remote working mode or the "Go to" working mode is merely described as an example of a specific operation mode of the operation mode of network-connected control, and cannot construed as a limit on the operation mode of network-connected control.

In this embodiment, the device further includes a timing module not illustrated in the figures. The timing module is configured to: time, when the network status is the network-disconnected state, duration of the network-disconnected state. The performing module 202 is specifically configured to perform, when the duration that is of the network-disconnected state and that is timed by the timing module is greater than a preset time threshold, the preset action.

In another embodiment of the present disclosure, the timing module may further be configured to: time, when the network signal intensity is lower than the preset signal threshold, duration of the signal intensity continually being lower than the preset signal threshold. The performing module 202 is specifically configured to perform, when the duration that is of the signal intensity being low and that is timed by the timing module is greater than a preset time threshold, the preset action.

In this embodiment, the performing module 202 is specifically configured to: switch the cleaning robot to an automatic cleaning mode and perform a corresponding cleaning action, maintain a current operation mode and keep performing a cleaning action, or return to a charging dock for charging.

The device embodiment is substantially similar to the method embodiment, so that the device embodiments are described relatively briefly, and please refer to a part of descriptions in the method embodiment for relevant contents.

The device embodiment described above is merely exemplary. The foregoing units described as separate components may be or may not be physically separate. The components displayed as units may be or may not be physical units; and may be located at one place or may be distributed on a plurality of network units. Some or all of the modules may be selected based on actual requirements to achieve objectives of the solutions of the embodiments. One of ordinary skill in the art can understand and implement the embodiments without making creative efforts.

Embodiments of the present disclosure provide a cleaning robot control method and a cleaning robot control device. When the cleaning robot is disconnected from a mobile terminal because the cleaning robot is in the network-disconnected state or the network signal intensity is lower than the preset signal intensity threshold, the cleaning robot can perform the preset action, to avoid affecting use of a user due to a failure of positioning robot or an abrupt shut down, thereby improving user experience.

In addition, an embodiment of the present disclosure further provides a computer-readable storage medium. The computer-readable storage medium stores a computer program, and when the program is executed by a processor, operations of the foregoing method are implemented.

In this embodiment, when implemented in a form of a software functional unit and sold or used as an independent product, the integrated module/unit in the cleaning robot control device may be stored in a computer-readable storage medium. Based on such an understanding, all or some procedures according to the method embodiment are implemented in the present disclosure. The procedures may alternatively be achieved by relevant hardware instructed by a computer program. The computer program may be stored in a computer-readable storage medium, and when the computer program is executed by a processor, operations of the foregoing various method embodiments can be implemented. The computer program includes computer program code, and the computer program code may be in a form of source code, object code, or an executable file, or some intermediate forms. The computer-readable medium may include any entity or device that can carry the computer program code, a recording medium, a USB flash memory, a mobile hard disk, a magnetic disk, an optical disc, a computer storage device, a read-only memory (ROM), a random access memory (RAM), an electric carrier signal, a telecommunications signal, a software distribution medium, and the like. It should be noted that contents included in the computer-readable medium may be properly added or omitted according to requirements on law-making and patent practice in the jurisdiction. For example, in some jurisdictions, according to law-making and patent practice requirements, the computer-readable medium does not include an electric carrier signal and a telecommunications signal.

Figure 5:
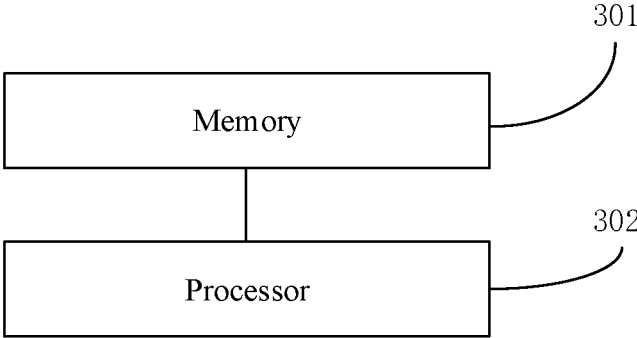
FIG. 5 is a schematic diagram of a cleaning robot according to an embodiment of the present disclosure.

FIG. 5 illustrates a schematic diagram of a cleaning robot according to an embodiment of the present disclosure. The cleaning robot according to this embodiment of the present disclosure includes a memory 301, a processor 302, and a computer program that is stored in the memory 301 and that can be executed by the processor 302, where when the processor 302 executes the computer program, operations, for example, operations illustrated in FIG. 1 or FIG. 2, of the foregoing various cleaning robot control method embodiments are implemented. Alternatively, when executing the computer program, the processor 302 executes functions of various modules/units, for example, the first obtaining module 201 and the performing module 202 illustrated in FIG. 3, in the foregoing various cleaning robot control device embodiments.

For example, the computer program may be divided into one or more modules/units. The one or more modules/units are stored in the memory, and are executed by the processor, to complete the present disclosure. The one or more modules/units may be a series of computer program instruction segments that can complete a particular function, and the instruction segments are used to describe a process of the computer program executed on the cleaning robot control device. For example, the computer program may be divided into the first obtaining module 201 and the performing module 202.

The cleaning robot may be a computing device such as a desktop computer, a laptop computer, a palmtop computer, or a cloud server. The cleaning robot may include but is not limited to a processor and a memory. One of ordinary skill in the art can understand that the schematic diagram of FIG. 5 is merely an example of the cleaning robot, and cannot be construed as a limit to the cleaning robot, and the cleaning robot may include more or fewer components than those illustrated in the drawings, or combine some components, or have different components. For example, the cleaning robot may further include an input/output device, a network access device, a bus, and the like.

The processor may be a central processing unit (CPU), or may be another general-purpose processor, a digital signal processor (DSP), an application-specific integrated circuit (ASIC), a field programmable gate array (FPGA), another programmable logic device, a discrete gate or a transistor logic device, a discrete hardware component, or the like. The general-purpose processor may be a microprocessor, or the processor may be any conventional processor. The processor is a control center of the cleaning robot, and is connected to various parts of the whole cleaning robot through various interfaces and lines.

The memory may be used to store the computer program and/or module, the processor runs or executes the computer program and/or module stored in the memory and invokes data stored in the memory, to implement various functions of the cleaning robot. The memory may mainly include a program storage area and a data storage area. The program storage area may store an operating system, an application for at least one function (for example, an audio play function or a video play function), and the like. The data storage area may store data (for example, audio data or an address book) generated based on use of the mobile phone or the like. In addition, the memory may include a high-speed random access memory, or may include a nonvolatile memory, for example, a hard disk, internal storage, a plug-in hard disk, a smart media card (SMC), a secure digital (SD) card, a flash card, at least one magnetic disk storage device, a flash memory, or another volatile solid-state storage device.

One of ordinary skill in the art can understand that, although some embodiments herein include some features of another embodiment other than other features, a combination of features of different embodiments means that the combination falls within the scope of the present disclosure and forms a different embodiment. For example, in the appended claims, any one of embodiments that claim protection can be used in any manner of combination.

Finally, it should be noted that the foregoing embodiments are merely used to describe technical solutions of the present disclosure, but not to limit the present disclosure. Although the present disclosure is described in detail with reference to the foregoing embodiments, one of ordinary skill in the art should understand that, the technical solutions described in the foregoing various embodiments can still be modified, or some technical features in the foregoing various embodiments can be equivalently replaced, and these modifications or replacements do not cause that the essence of the corresponding technical solutions is apart from the spirit and scope of the technical solutions in the various embodiments of the present disclosure.

What is claimed is:

1. A cleaning robot control method, applied to a cleaning robot, wherein the method comprises:

obtaining a current operation mode of the cleaning robot;

obtaining a network status of the cleaning robot in response to determining that the cleaning robot is currently in an operation mode of network-connected control, wherein the operation mode of network-connected control comprises a remote working mode or a "Go to" working mode, the "Go to" working mode indicates that the cleaning robot automatically moves to a position after a user designates the position; and performing a preset action when the network status is that a network signal intensity is lower than a preset signal intensity threshold, wherein performing the preset action when the network status is that the network signal intensity is lower than the preset signal intensity threshold comprises:

starting timing when the network signal intensity is lower than the preset signal intensity threshold; and performing, when a duration of the network signal intensity being lower than the preset signal intensity threshold is greater than a preset time threshold, the preset action, wherein performing the preset action comprises:

switching the cleaning robot to an automatic cleaning mode and performing a corresponding cleaning action; maintaining a current operation mode and continuing performing a cleaning action; or returning to a charging dock for charging.

2. The method according to claim 1, wherein the network status of the network signal intensity being lower than the preset signal intensity threshold comprises that the network status is a network-disconnected state.

3. The method according to claim 2, wherein when the network status is the network-disconnected state, performing the preset action comprises:

timing a duration of the network-disconnected state; and performing, when the duration of the network-disconnected state is greater than a preset time threshold, the preset action.

4. A non-transitory computer-readable storage medium, wherein the computer-readable storage medium stores a computer program, and when the program is executed by a processor, operations of a cleaning robot control method are implemented, the method comprising:

obtaining a current operation mode of the cleaning robot;

obtaining a network status of the cleaning robot in response to determining that the cleaning robot is currently in an operation mode of network-connected control, wherein the operation mode of network-connected control comprises a remote working mode or a "Go to" working mode, the "Go to" working mode indicates that the cleaning robot automatically moves to a position after a user designates the position; and performing a preset action when the network status is that a network signal intensity is lower than a preset signal intensity threshold, wherein performing the preset action when the network status is that the network signal intensity is lower than the preset signal intensity threshold comprises:

starting timing when the network signal intensity is lower than the preset signal intensity threshold; and performing, when a duration of the network signal intensity being lower than the preset signal intensity threshold is greater than a preset time threshold, the preset action, wherein performing the preset action comprises:

switching the cleaning robot to an automatic cleaning mode and performing a corresponding cleaning action; maintaining a current operation mode and continuing performing a cleaning action; or returning to a charging dock for charging.

5. A cleaning robot, comprising a memory, a processor, and a computer program that is stored in the memory and that is run on the processor, wherein when the program is executed by the processor, operations of a cleaning robot control method are implemented, the method comprising:

obtaining a current operation mode of the cleaning robot;

obtaining a network status of the cleaning robot in response to determining that the cleaning robot is currently in an operation mode of network-connected control, wherein the operation mode of network-connected control comprises a remote working mode or a "Go to" working mode, the "Go to" working mode indicates that the cleaning robot automatically moves to a position after a user designates the position; and performing a preset action when the network status is that a network signal intensity is lower than a preset signal intensity threshold, wherein performing the preset action when the network status is that the network signal intensity is lower than the preset signal intensity threshold comprises:

starting timing when the network signal intensity is lower than the preset signal intensity threshold; and performing, when a duration of the network signal intensity being lower than the preset signal intensity threshold is greater than a preset time threshold, the preset action, wherein performing the preset action comprises:

switching the cleaning robot to an automatic cleaning mode and performing a corresponding cleaning action; maintaining a current operation mode and continuing performing a cleaning action; or returning to a charging dock for charging.

6. The cleaning robot of claim 5, wherein the network status of the network signal intensity being lower than the preset signal intensity threshold comprises that the network status is a network-disconnected state.

7. The cleaning robot of claim 6, wherein when the network status is the network-disconnected state, performing the preset action comprises:

timing a duration of the network-disconnected state; and performing, when the duration of the network-disconnected state is greater than a preset time threshold, the preset action.

* * * * *